United States Patent
Atlas et al.

[19]

[11] Patent Number: 5,963,352
[45] Date of Patent: Oct. 5, 1999

[54] LINEARIZATION ENHANCED OPERATION OF SINGLE-STAGE AND DUAL-STAGE ELECTRO-OPTIC MODULATORS

[75] Inventors: Dogan A. Atlas, Duluth; Rezin E. Pidgeon, Jr., Atlanta; Frank R. Little, Alpharetta, all of Ga.

[73] Assignee: Scientific-Atlanta, Inc., Norcross, Ga.

[21] Appl. No.: 08/804,424

[22] Filed: Feb. 21, 1997

[51] Int. Cl.$^6$ ................................................ H04B 10/04
[52] U.S. Cl. ............................................. 359/161; 359/180
[58] Field of Search .................................. 359/161, 162, 359/180, 187, 189, 194, 195

[56] References Cited

U.S. PATENT DOCUMENTS

| | | | |
|---|---|---|---|
| 4,157,508 | 6/1979 | Hecken | 327/346 |
| 5,172,068 | 12/1992 | Childs | 328/162 |
| 5,249,243 | 9/1993 | Skeie | 403/409.1 |
| 5,278,923 | 1/1994 | Nazaranthy et al. | 385/3 |
| 5,282,072 | 1/1994 | Nazaranthy et al. | 359/157 |
| 5,327,279 | 7/1994 | Farina et al. | 359/180 |
| 5,418,637 | 5/1995 | Kuo | 359/161 |
| 5,436,749 | 7/1995 | Pidgeon, Jr. et al. | 359/161 |
| 5,812,294 | 9/1998 | Wilson | 359/161 |

OTHER PUBLICATIONS

Nazaranty et al., "Progress in Externally Modulated AM CATV Transmission Systems", *Journal of Lightwave Technology*, vol. 11, No. 1, pp. 82–105 (1993).

Boddep et al., "Comparison of second and third order distortion in intensity modulated InGaAsP lasers and an LiNbO$_3$ external modulator," Paper WK2, OFC '89 Conference on Optical Fiber Communications, Houston, TX, Feb. 1989.

*Primary Examiner*—Leslie Pascal
*Attorney, Agent, or Firm*—Kenneth M. Massaroni; Kelly A. Gardner; Hubert J. Barnhardt, III

[57] ABSTRACT

A distortion circuit for linearizing third-, fifth- and seventh-order distortion components in a non-linear optical communications system includes at least one group of series connected diodes coupled to a common input terminal for receiving a signal source at one end and to an inductor and a capacitor at the other end, a resistance coupled to the common input terminal and a bias source for providing a bias current to the group of series connected diodes. The distortion circuit may be implemented as a predistortion circuit in the headend of the optical communications system or as a postdistortion circuit at the receiving end.

8 Claims, 10 Drawing Sheets

LINEARIZATION ENHANCED OPERATION OF SINGLE-STAGE AND DUAL-STAGE ELECTRO-OPTIC MODULATORS

BACKGROUND OF THE INVENTION

A. Field of the invention

The present invention relates to linearization circuits in fiber optical communications systems and more particularly to providing distortion compensation for third-, fifth- and seventh-order intermodulation and harmonic distortion components of single-stage and dual-stage serial Mach-Zehnder modulators.

B. Statement of Related Art

Optical communications systems adapted to carry a wide range of information including voice, video and data are well known in the art. The typical optical communications system includes an optical modulator or a laser transmitter which transduces an electrical information signal into an optical signal. The optical signal is then carried over an optical fiber communications link where it is converted back to an electrical signal by a photodetector of an optical receiver. The transmission scheme may be analog or digital and the modulation scheme amplitude, phase, frequency, or any combination of the above.

Particularly within the field of optical communications, the use of Mach-Zehnder optical modulators are well-known. The Mach-Zehnder optical modulator mixes a radio frequency (RF) information-bearing signal with a lightwave carrier by electromagnetic phase interferometry. Upon entering the Mach-Zehnder optical modulator, the lightwave carrier is typically split into two signals that are coupled into separate waveguides formed in the crystal structure of the modulator. Electrodes are placed in close proximity to the waveguides in the device. An RF information-bearing signal is applied to the electrodes next to one of the waveguides. The propagation of the lightwave carrier through the waveguides is affected by electric field variations that the RF signal causes in the propagation characteristic of the waveguide in the area near the electrodes. The electric field causes a local change in the refractive indices around the waveguides, thereby speeding up the propagation of the wave in one path while delaying the other. The relative phase of the two lightwave signals in the modulator is changed in proportion to the modulating signal applied to the electrodes. At the output of the Mach-Zehnder optical modulator, the phase modulated optical carrier signals are recombined. When the two optical signals having variations in relative phase are recombined, phase interference occurs which can be destructive and/or constructive. The result is a modulated lightwave output having amplitude changes in proportion to the modulating RF signal. The modulated lightwave output can then be coupled to a fiber optic medium for transmission over long distances.

The optical modulation provided by Mach-Zehnder optical modulators is generally superior to that of direct laser modulators. One advantage with the Mach-Zehnder optical modulator is that it is not subject to "chirp" (residual frequency modulation) where the spectrum of the optical beam is broadened. Other advantages are that Mach-Zehnder optical modulators have wide RF bandwidths and are memoryless devices with predictable distortion profiles. The advantages of using optical modulators versus direct laser modulators in terms of non-linear intermodulation distortion are discussed further by G. E. Bodeep and T. Darice, "Comparison of second and third order distortion in intensity modulated InGaAsP lasers and an LiNbO$_3$ external modulator", Paper WK2, OFC '89 Conference on Optical Fiber Communications, Houston, Tex., February 1989, and is incorporated herein by reference.

However, optical modulators, like their semiconductor counterparts in RF electronics, are non-linear devices. The typical Mach-Zehnder optical modulator consists of a lithium niobate (LiNbO$_3$) crystal device having linear and non-linear modulation characteristics. Any deviation of the modulator transfer function from the linear range of the modulator causes odd- and even-order harmonic distortion. Therefore, in order to optimize the quality of the modulated output from an electro-optical modulator, it is desirable to apply a bias control to the device to set its operating point, or bias point, as close as possible to the center of its linear range. Since the principle of operation of the Mach-Zehnder optical modulator is phase interferometry, the center bias point is very sensitive to temperature, input signal fluctuations, and manufacturing tolerances. If not properly biased, the modulator will generate even-order harmonic distortions in addition to odd-order harmonic distortions. These distortions degrade signal quality, thereby reducing the dynamic range of the system.

Recently, there has been a growing interest in the use of Mach-Zehnder optical modulators for use in high power amplitude modulated vestigial sideband (AM-VSB) CATV fiber optic supertrunk and distribution systems for long-haul transmission. However, these systems require high performance (high signal modulation depth) fiber optic broadcast channels to overcome the noise accumulated by fiber amplifiers placed along the transmission path. However, as the signal modulation depth is increased, distortion increases rapidly. The system cannot tolerate higher-order harmonic distortions such as third-, fifth- and seventh-order distortion components. Even-order distortion components of the Mach-Zehnder optical modulator may be suppressed by properly adjusting the electrical bias level, leaving only the odd-order distortion components as the limiting factor in achieving a linear fiber optic system.

The transfer function for the output power of the Mach-Zehnder optical modulator has a predictable distortion profile of a well-known sinusoidal function. A number of techniques are known in the art for suppression of third-order distortion components. For instance, third-order distortion components can be suppressed in a single-stage Mach-Zehnder optical modulator by electrically predistorting the multichannel signals. Third order distortion components can also be eliminated in a dual-stage cascaded electro-optic modulator by driving the two modulator electrodes with an RF signal split in two in-phase paths with properly adjusted magnitudes. These methods are described by U.S. Pat. Nos. 5,249,243 and 5,278,923. Moreover, U.S. Pat. No. 5,327,279 discloses a number of other methods known in the art for improving linearization of Mach-Zehnder optical modulators.

Predistortion techniques have generally been favored over other linearizing techniques because of its relatively wide-band characteristics and ability to function in stand-alone units. A predistortion circuit distorts a modulating signal equally in amplitude and frequency but phase shifted 180° with respect to the transfer function of the optic modulator before feeding the modulating signal to the optical modulator. Thus, the predistortion effectively cancels the distortion produced by the optical modulator. A predistortion circuit, in theory, would employ a simple diode network to synthesize the transfer function arc sin (x). The transfer function arc sin (x) is used since the transfer function of the optic modulator is sin (x). Thus, when the signal is optically modulated, the distortion components of the resulting optical signal are thereby canceled (since sin [arc sin (x)]=x).

However, predistortion circuits in the prior art have only been able to approximate an ideal predistortion circuit. As a result, the present state of the art cannot provide higher optical modulation depths necessary for transmitting high performance AM-VSB CATV fiber optic broadcast channels.

It is therefore an object of the present invention to provide improved linearity through providing improved distortion of the RF signal in an optical system to accommodate transmission of high performance AM-VSB CATV signals.

Another object of the present invention is to provide improved linearity by distorting the RF signal in an optical system to accommodate transmission of high performance AM-VSB CATV signals.

Yet another object of the present invention is to provide a distortion circuit for linearizing an externally modulated optical modulator.

Still another object is to provide a distortion circuit which generates higher-order harmonic distortion components to cancel non-linearities of Mach-Zehnder optical modulators.

SUMMARY OF THE INVENTION

The present invention is a method and apparatus for compensating third-, fifth-, and seventh-order harmonic distortion products in a nonlinear optical transmission system having a single-stage or a dual-stage cascaded Mach-Zehnder interferometer. The system utilizes an odd-order generator that produces an inverse transfer function approximation of the expected output modulation intensity of the Mach-Zehnder inferometer. The odd-order generator may be implemented either as a branch-type or an in-line type circuit. The circuit itself incorporates shunt and/or series diode circuitry. The invention may be implemented at the headend for predistortion of the RP signal such that the optically modulated signal is free from up to the seventh-order distortion components. Alternatively, the invention may be implemented at the receiving end for postdistortion of the RF signal to filter out the distortion components. The system provides an optical signal having improved linearity and higher depth of modulation while still maintaining system distortion specifications.

These as well as other novel advantages, details, embodiments, features and objects of the present invention will be apparent to those skilled in the art from following the detailed description of the invention, the attached claims and accompanying drawings, listed hereinbelow, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrative embodiments, in which.

DETAILED DESCRIPTION OF THE PREFERRED EMBODIMENT

For a better understanding of the present invention, reference may be had to the following detailed description taken in conjunction with the appended claims and accompanying drawings.

Figure 1:
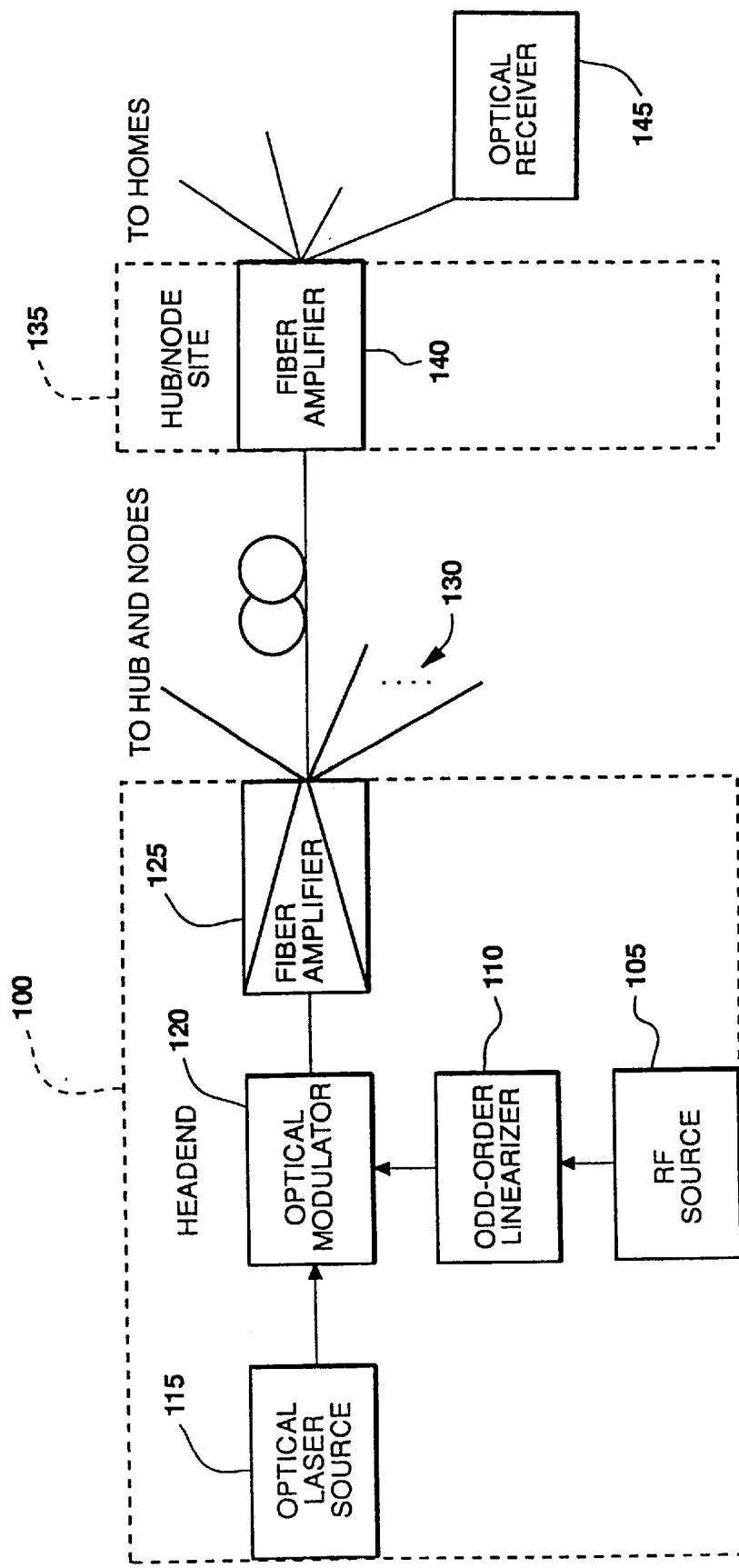
FIG. 1 is a block diagram of an optical communications system constructed in accordance with the first embodiment of present invention.

FIG. 1 is a system block diagram of an optical communications system constructed in accordance with the first embodiment present invention. The system generally includes a headend 100 which transmits optical signals over an optical communications link 130, generally an optical fiber, to an optical receiver 145. The headend 100 includes an RF source 105, an optical laser source 120, an odd-order linearizer 110, and an optical modulator 120. In addition, the headend 100 may also include a fiber amplifier 125. In the optical modulator 120, a predistorted RF information-bearing signal is impressed on a lightwave carrier signal by phase interferometry in a manner known in the art, producing an amplitude modulated optical signal at the output. The amplitude modulated optical signal may then be amplified by the fiber amplifier 125 and coupled to the optical communications link 130 for transmission to a desired location. In the preferred embodiment, the optical communications link 130 is a CATV fiber/coax broadcast link. The optical communications link 130 may optionally include one or more hub/node sites 135 where the optical signal is amplified by a fiber amplifier 140. Further, the hub/node site 135 may also allow the optical signal to be split such that it can be sent to a plurality of optical receivers 145.

At the optical receiver 145, the modulated optical signal is generally converted back to an RF information-bearing electrical signal by an optical detector, commonly a photo-diode. The optical detector transduces the intensity modulated signal into an amplitude modulated electric current signal. The optical detector is generally reverse biased from a bias source through current limiting resistors. The output of the photodetector may also be amplified by a linear low-noise RF amplifier which may be a push-pull transimpedance amplifier or other suitable type designed for CATV applications. The photodetector amplifier transforms the electrical current signal into an RF amplitude modulated voltage signal similar to that from the RF source 105 at the headend 100. This AM signal may then be amplified to a suitable level by a buffer amplifier and output for further processing, or for direct distribution to a multiplicity of CATV subscribers. (The particular elements of the optical receiver 145 are not shown in the figure.)

At the headend 100, the optical laser source 115 is preferably a single-mode laser source which provides a lightwave carrier signal upon which information is carried over the optical communications link 130. The lightwave carrier signal enters the optical modulator 120 as its optical input. The optical modulator 120 is preferably a Mach-Zehnder Inferometric (MZI) optical modulator 120. The RF source 105 of the optical transmission system provides the information that is to be embedded in the optical signal and transferred over the communications link. The RF source 105 preferably provides multiplexed amplitude modulated vestigal sideband (AM-VSB) analog and/or digital video multichannel signals originating from a remote information source. The remote information source may be a remote headend (not shown) where video signals are transmitted and received from satellites, off-air antenna sources or fiber/coax cables. Before the RF signal is applied to the optical modulator 120 as its RF input, it is sampled and processed by the odd-order linearizer 110. The odd-order linearizer 110 consists of a higher-order predistortion circuit which generates a predistortion signal of substantially the same amplitude and frequency but phase shifted by 180° with respect to the expected distortion of the optical signal by modulation. By predistorting the RF signal, the distortion caused by the optical modulator 120 may be suppressed, thereby improving the linearity of the system and allowing signals to be transmitted with higher depth of modulation.

Figure 2:
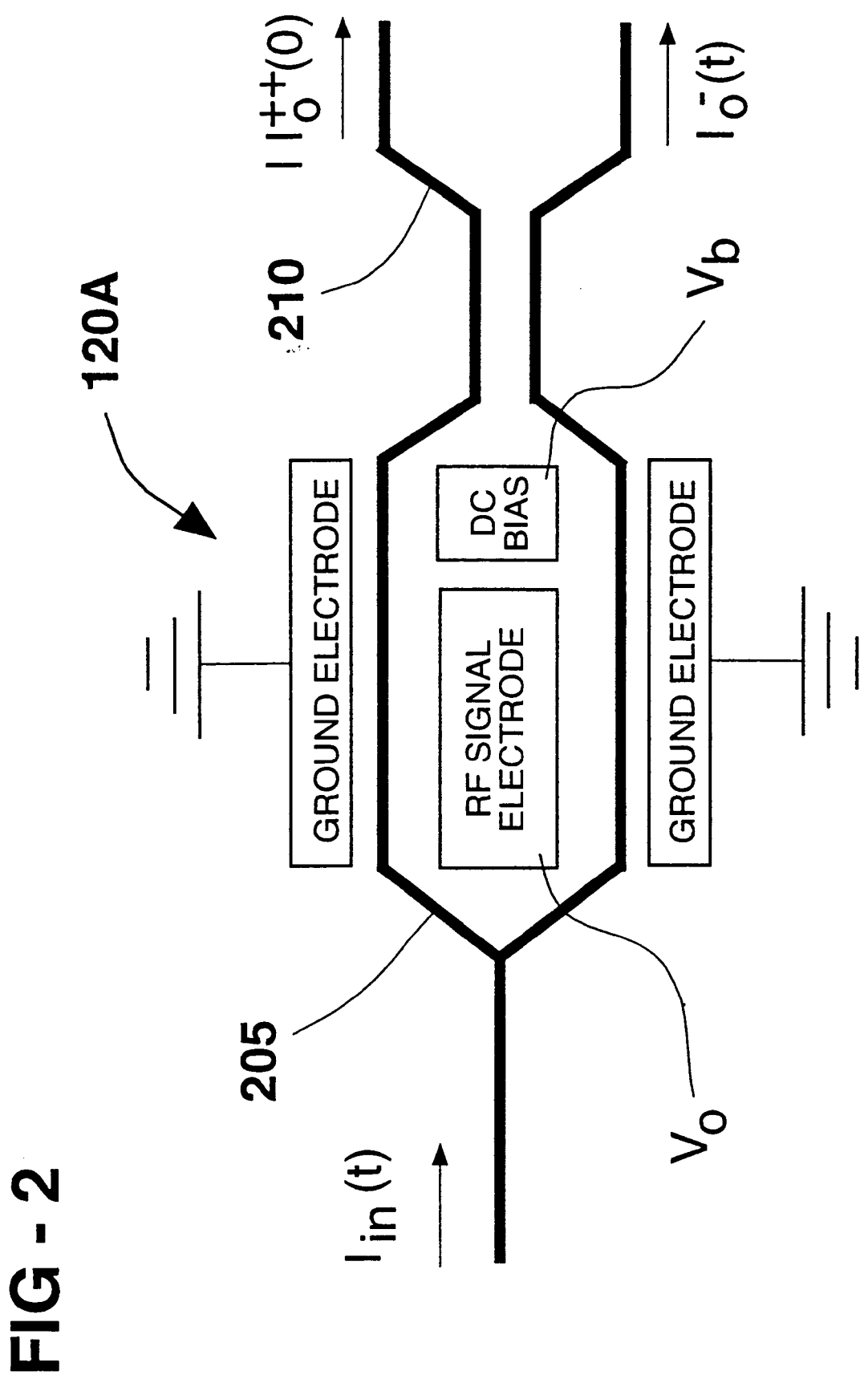
FIG. 2 is a schematic diagram of a single-stage Mach-Zehnder Interferometric optical modulator.

FIG. 2 is a schematic diagram of a single-stage dual output Mach-Zehnder Interferometric optical modulator (MZI) 120A. A single-stage MZI may have either a single output (not shown) or a dual complementary output. The single output MZI is composed of a Y-branch or a 1×2 directional coupler at the input with a Y-branch interferometer at the output. The dual complementary output MZI 120A is composed of a Y-branch or a 1×2 directional coupler 205 at the input and a 2×2 directional coupler 210 at the output. The single-stage MZI 120A, whether single output or dual complementary output, exhibits a raised cosine input-output nonlinear transfer characteristic with a very high extinction ratio (on-to-off transmission ratio). For application with multichannel analog CATV signal transmission, the device is biased at the quadrature point or the center-point of its transfer function where linearity is maximized. Although the signal output intensity is reduced by 3 dB at the quadrature point, the even-order harmonic distortion components are canceled leaving only odd-order harmonic distortion components. The odd-order harmonic distortion components can be canceled by electronically predistorting the multichannel signal as disclosed herein prior to inputting the RF signal into the MZI 120. Alternatively, these distortion components can be canceled by postdistorting the signal at the receiving end as disclosed herein.

When driven by multiple input signals, the normalized electrical field, E(t), at one of the output ports of the single-stage dual output MZI 120A can be expressed as:

$$E(t) = \sqrt{\frac{P_i}{4}} \left[ e^{j\frac{\beta}{2}} + e^{-j\frac{\beta}{2}} \right] e^{j\omega_o t}$$

where $P_i$ is the input power, $\beta$ is the modulator optical phase which is expressed as a function of time, and $\omega_o$ is the optical frequency of oscillation. The normalized electric field at the other output port is the same magnitude but out of phase by 180°. The output of the MZI 120A is thus a raised cosine function of the modulator optical phase, $\beta$, which is determined by the bias to the DC and RF electrical inputs to the MZI 120A. When the MZI 120A is biased at its quadrature point, the output power, $P_{out}$, can then be expressed as:

$$P_{out} = P_o [1 + \sin \beta]$$

where $P_o = P_i/2$ is the average output power. For simplicity of the equations, time dependencies have been omitted in the variables. Similarly, loss factors associated with commercially available MZIs 120 (such as input/output fiber coupling losses, Y-branch bend losses, coupler bend losses, and waveguide losses) have also been omitted for simplicity.

When a single or multichannel signal is fed by the RF source 105 directly to the optical modulator 120 (i.e., no predistortion circuit 110), the modulator optical phase can be expressed as:

$$\beta = x$$

where $$x = m \sum_{i=1}^{N} \cos[\omega_i t + \theta_i],$$

and $m = \pi V_o / V_\pi$ is the modulation depth per channel (assumed equal for all channels), $V_o$ is the peak RF channel voltage, $V_\pi$ is the RF half-wave voltage of the modulator, N is the number of channels, $\omega_i$ is the $i^{th}$ channel frequency, and $\theta_i$ is the phase of the carrier signal at the $i_{th}$ channel frequency.

In an ideal odd-order predistortion circuit, the transfer function of power output of the predistortion circuit would be the inverse function of the transfer function of the single-stage MZI 120 such that the phase can be expressed as:

$$\beta = \arcsin [x]$$

The perfectly linearized modulator output power, $P_{out}$, can then be expressed as, $P_o$, P [1+x]. However, electronic predistortion circuits known in the art can only synthesize an approximation of this inverse function such that only third-order intermodulation and harmonic distortion components are suppressed. For instance, in the inventions disclosed in U.S. Pat. Nos. 5,424,680 and 5,172,068, only third-order components are suppressed.

Figure 3:
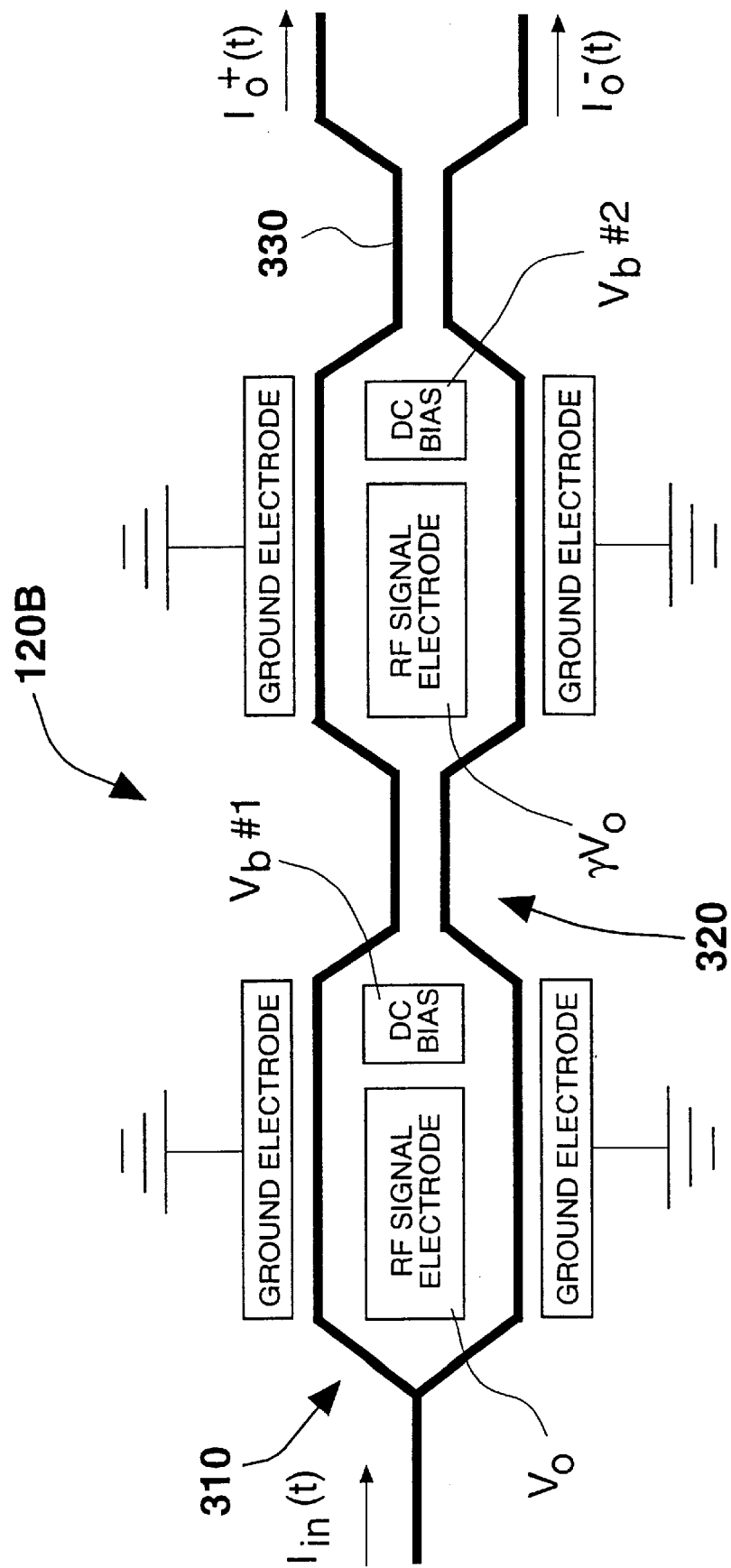
FIG. 3 is a schematic diagram of a dual-stage cascaded Mach-Zehnder Interferometric optical modulator.

Alternatively, improved suppression of third-order distortion components may be achieved using a dual-stage cascaded MZI. FIG. 3 shows a schematic diagram of a dual-stage cascaded, Y-fed, dual output MZI 120B. This dual-stage cascaded MZI 120B is composed of a Y-branch or a directional coupler 310 at the input, two MZIs (1×2 and 2×2 phase modulators) cascaded by a 2×2 coupler 320 between the two modulators, and a 2×2 directional coupler 330 at the output.

The electric field at one of the output ports of the dual-stage cascaded MZI 120B when biased at the center-point of its transfer function is given by:

$$E(t) = \sqrt{\frac{P_i}{4}} \left[ \left( \cos(2\theta)\cos\left(\gamma\frac{\beta}{2}\right) + j\sin\left(\gamma\frac{\beta}{2}\right) \right) e^{\frac{jB}{2}} + j\sin(2\theta)\cos\left(\gamma\frac{\beta}{2}\right) e^{-\frac{jB}{2}} \right] e^{j\omega_o t}$$

where θ is the coupler phase and γ is the ratio between the information bearing signal voltage at the second and first stage of the RF modulation ports. The normalized electric filed at the other output port is the same magnitude but out of phase by 180°. The coupler phase θ and the signal split factor γ are chosen such that the third-order intermodulation and harmonic distortion component is suppressed. The modulator output power can be expressed as:

$$P_{out}(x) = P_o[1 + a_i \sin(x) + a_2 \sin((1+\gamma)x) - a_3 \sin((1-\gamma)x)]$$

where:

$a_1 = \sin(\theta) \cos(2\theta)$ $a_2 = \sin(2\theta)(\cos(\theta))^2$ $a_3 = \sin(2\theta)(\sin(\theta))^2$ For simplicity of the equations, time dependencies have been omitted in the variables. Similarly, loss factors associated with commercially available MZIs 120 (such as input/output fiber coupling losses, Y-branch bend losses, coupler bend losses, and waveguide losses) have also been omitted for simplicity.

Although the dual-stage cascaded MZI 120B can achieve improved suppression over a single-stage MZI, fifth- and higher-order harmonic distortion components continue to degrade signal quality, thereby limiting system dynamic range. To overcome this problem under the present invention, the odd-order linearizer 110 produces fifth and/or seventh-order harmonic distortion components. The odd-order linearizer 110 is to be used in conjunction with any MZI 120, either single-stage or dual-stage cascaded, to simultaneously suppress third-order and higher-order distortion components. However, it is conceivable that a similar predistortion generator could be used in conjunction with other types of optical modulators 120. The object of the odd-order linearizer 110 is to produce up to the seventh-order power series coefficients that are inverse functions of the transfer functions for the modulation phase of the single-stage (i.e., sin (x)) or the dual-stage (i.e., $a_1$, sin (x)+$a_2$sin ((1+γ)x)−$a_3$ sin ((1−γ)x)) MZI 120. For example, the inverse function of the modulation phase for the single-stage MZI can be approximated as a power series expression as shown:

$$\arcsin(x) \approx x + \frac{1}{6}x^3 + \frac{3}{40}x^5 + \frac{5}{112}x^7 \quad (1)$$

The odd-order generator 410 thereby produces distortion components in accordance with the above equation. A similar power series expansion approximation can also be made for the inverse function of the modulation phase for the dual-stage modulator.

Figure 4:
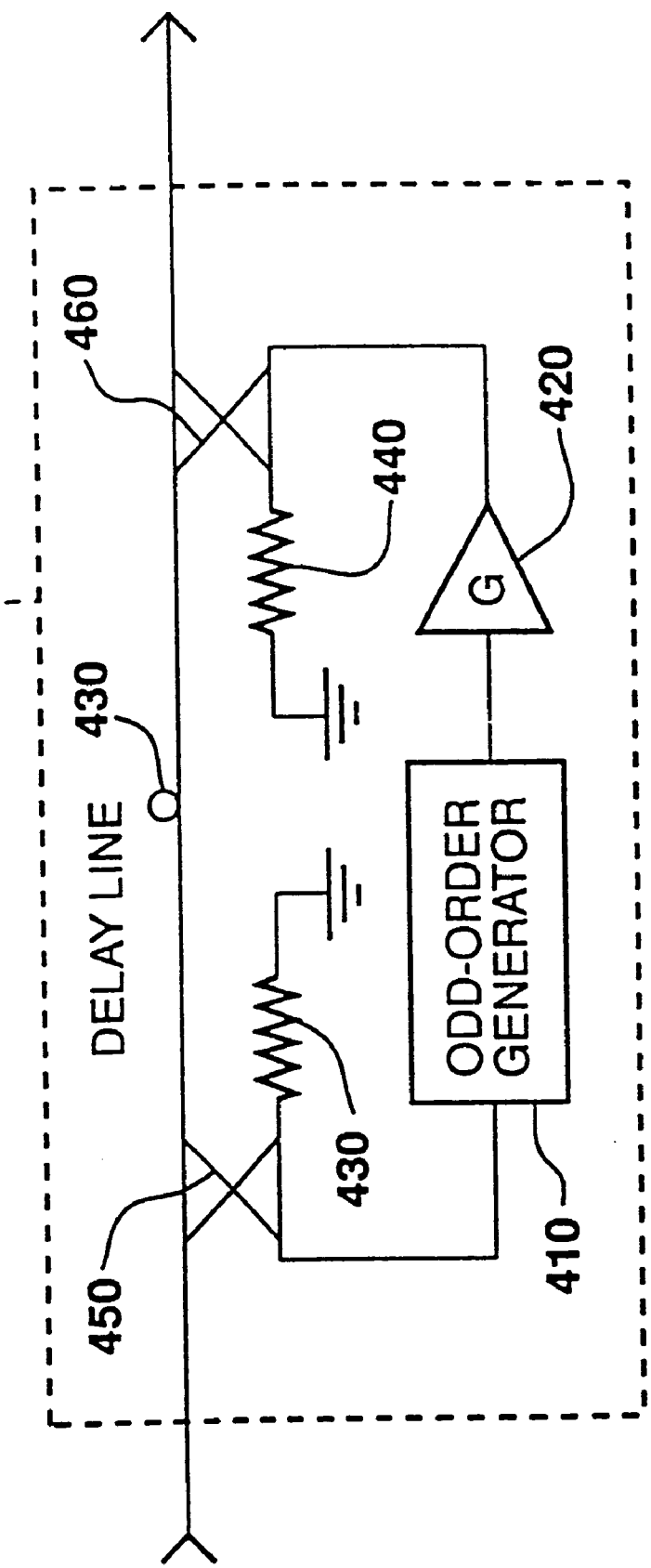
FIG. 4 is a schematic block diagram of a branch-type odd-order linearizer.

In FIG. 4, there is shown a schematic block diagram of one embodiment of the odd-order linearizer 110, referred to herein as a branch-type odd-order linearizer 110A. The branch-type odd-order linearizer 110A includes a first and second path, an odd-order generator 410 and an amplifier 420. The incoming signal of the branch-type odd-order linearizer 110A is split into first and second paths using a directional coupler 450. Resistors 430 and 440 terminate directional couplers 450 and 460 respectively. The signal following the first path is fed into an odd-order generator 410 where the signal is predistorted to match the inverse transfer function of the modulator optical phase of the optical modulator 120. The odd-order generator 410 is described in further detail below. The predistorted signal is then fed into a gain amplifier 420 having a gain G. The gain amplifier 420 may have a limited bandwidth having, for example, 1.5 times the highest frequency of the multi-channel signal. This is desirable to avoid distortion foldover in the CATV band thereby further improving distortion compensation. This applies for single-stage and dual-stage MZIs. Following the amplifier in the first path, an attenuator (not shown) may also be included to adjust the gain for reasons described in further detail below. The signal following the second path is delayed with a delay line 430 to match the delays of the signal following the first path as it goes through the odd-order generator 410, the gain amplifier 420, and the optional attenuator. The delay line 430 may be, for example, a predetermined length of coaxial cable. The signal following the second path may also include a limiter or an automatic level control (not shown). The limiter serves to gradually limit portions of the signal that reach above or below a certain voltage level to avoid clipping-induced distortion. Clipping-induced distortion is described in further detail by D. A. Atlas, *On the Overmodulation Limit in Externally Modulated Lightwave AM-VSB CATV Systems*, IEEE Photonics Technology Letters, Vol. 8, No. 5 (May 1996) and is incorporated herein by reference. The predistorted and amplified signal of the first path is then combined with the delayed signal of the second path with a directional coupler 460. Alternatively, the two paths may be combined using a reactive 3 dB combiner. The combined signal is then transferred to the optical modulator 120 for further processing.

Figure 5:
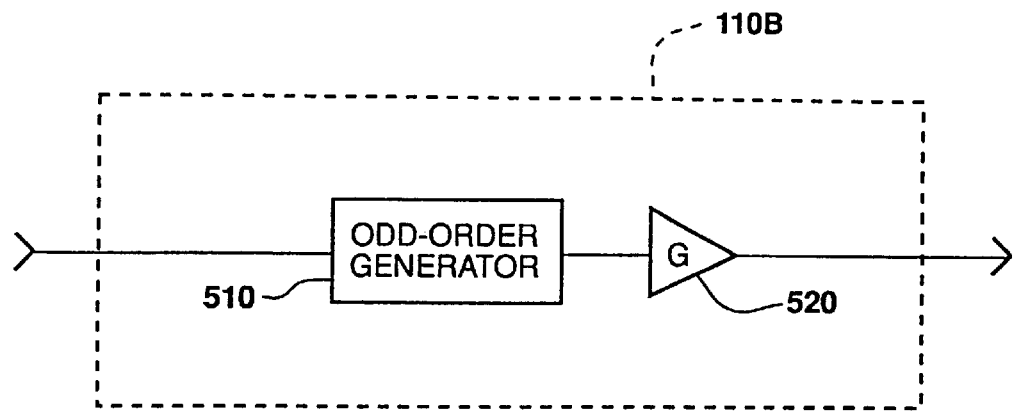
FIG. 5 is a schematic block diagram of an in-line-type odd-order linearizer.

FIG. 5 shows a schematic block diagram of another embodiment of the odd-order linearizer 110 referred to herein as an in-line type odd-order linearizer 110B. The incoming signal of the linearizer circuit is fed into an odd-order generator 510 where the signal is predistorted to match the inverse transfer function of the modulator optical phase of the optical modulator 120. The predistorted signal is then fed into a gain amplifier 520 having a gain G. As described in connection with the branch-type odd-order linearizer 110A, the signal may then be fed into an attenuator (not shown) and/or a limiter (not shown). The signal is then transferred to the optical modulator 120 for further processing.

Figure 6:
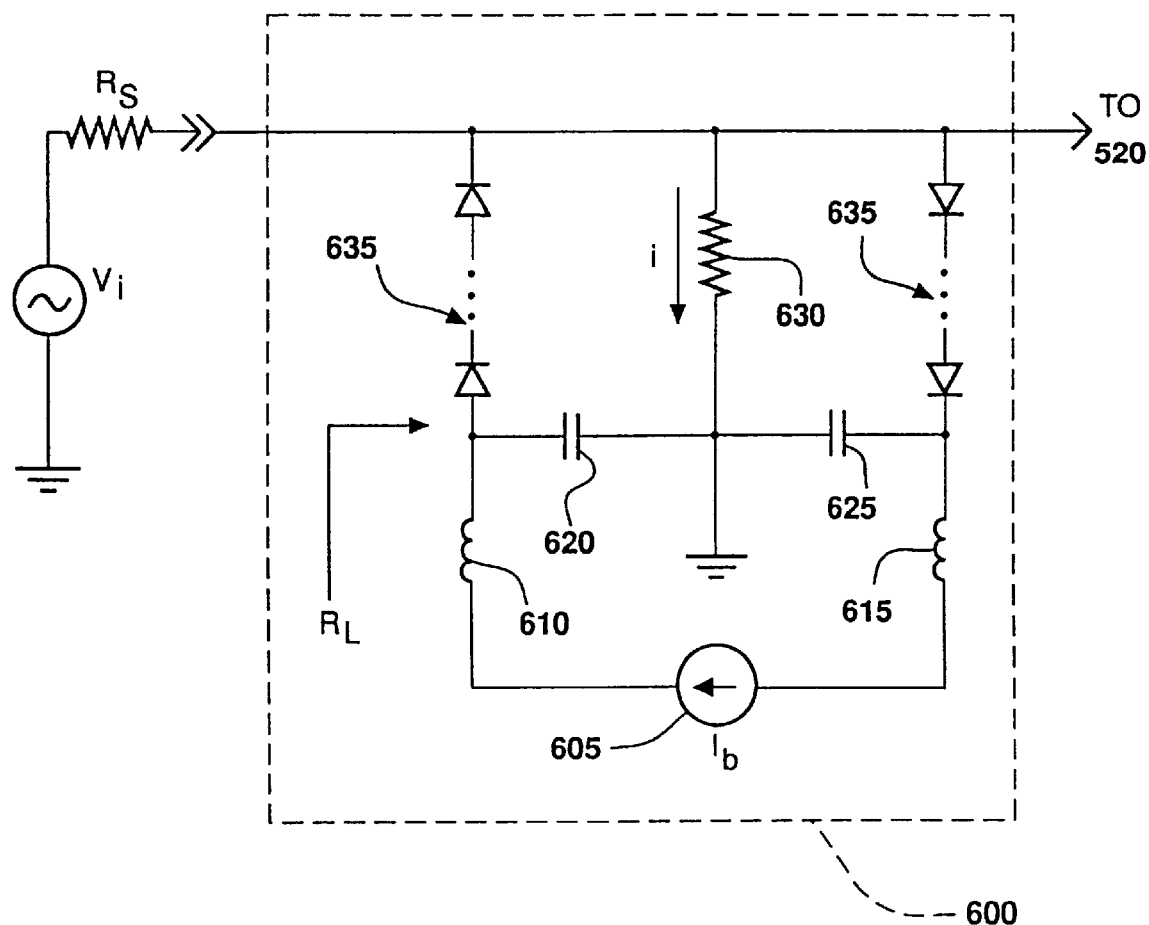
FIG. 6 is an electrical circuit diagram of a shunt diode predistortion circuit for use with the in-line-type odd-order linearizer.

FIG. 6 shows an electrical circuit diagram of a shunt diode predistortion circuit 600, a first embodiment of the odd-order generator 510 to be used in conjunction with the in-line-type odd-order linearizer 110B. The circuit 600 includes a bias current generator 605, inductors 610 and 615, capacitors 620 and 625, a resistor 630, and two series of N diodes 635. A voltage source $V_i$ and resistor $R_S$ are included to schematically represent the incoming RF signal from the RF source 105. The bias current generator 605 is connected in series with inductors 610 and 615. The bias current generator 605 is selected to match the load impedance, $R_L$, with the source impedance, $R_S$. The two series of N diodes 635 have a common input to the incoming RF signal at one end and are connected to a capacitor and inductor pair (620 & 610 and 615 & 625 respectively) at the other end. The series of N diodes 635 are the nonlinear elements of the circuit for performing the required predistortion of the RF signal. Capacitors 620 and 625 serve to provide a low impedance path for the RF signal to ground. The inductors 610 and 615 which are connected in series on opposite sides of the bias current generator 605 serve to decouple the bias current generator 605 from the RF path. Resistor 630 having a value of $R_c$, is connected to the incoming RF signal at one end and to ground at the other end.

Figure 8:
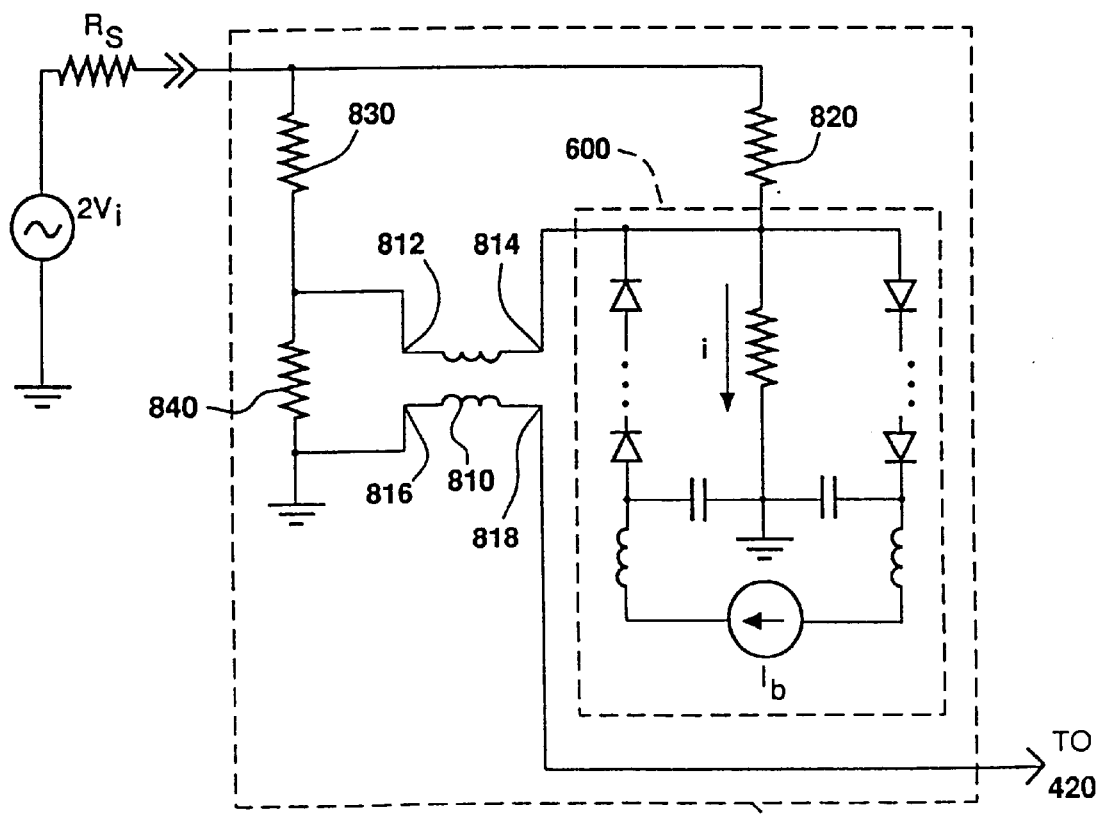
FIG. 8 is an electrical circuit diagram of a shunt diode predistortion circuit for use with the branch-type odd-order linearizer.

FIG. 8 shows an electrical circuit diagram of a shunt diode predistortion circuit 800, first embodiment of the odd-order generator 410 to be used in conjunction with the branch-type odd-order linearizer 110A. The circuit 800 includes the components of the circuit 600 of FIG. 6 as well as resistors 820, 830, 840 and a transformer 810. A voltage source $2V_i$ and resistor $R_S$ are included to schematically represent the incoming RF signal from the RF source 105. Resistor 820 having a value of $R_c$ receives the incoming RF signal and outputs to the circuit 600 of FIG. 6 and the transformer 810 at 814. The transformer 810 is preferably a 1-to-1 balanced-unbalanced transformer. Resistor 830 receives the incoming RF signal and outputs to the transformer 810 at 812 and resistor 840. Coupled at the other end of resistor 840 is the ground and transformer 810 at 816. The transformer 810 processes the signal and outputs the distorted signal at 818.

The transfer function formula for the voltage across the N diodes of circuits 600, 800 (the output voltage) can be expressed as:

$$V = NV_q a\sinh\left(\frac{i}{2I_b}\right)$$

where N is the number of diodes cascaded in series, $V_q$ is the diode thermal voltage, i is the signal current flowing through the resistor 630, and $I_b$ is the value of the bias current generator 605. Under these embodiments, the impedance of the circuit decreases as the input voltage increases. This equation describes a compressive nonlinear impedance characteristic as defined by Nazarathy et al. in U.S. Pat. No. 5,282,072. By expanding the expression for output voltage into a power series expression up to the seventh order, the transfer function for the output voltage can be approximated as a function of the applied input signal voltage, $V_i$, as:

$$V = c_1 V_i + c_3 V^3_i + c_5 V^5_i + c_7 V^7_i$$

where $c_k$ (k=1,3,5,7) are the coefficients of expansion. Under matched power conditions where $R_S = R_L$, and $R_L$ is the effective load impedance of resistor 630 (or 750) in parallel with the small-signal dynamic resistance of the two series of N diode 635 (or 735). the coefficients of expansion for circuit 600 are given by:

$$c_1 = \frac{1}{2}$$

$$c_3 = -\frac{1}{96}\left[1 - \frac{R_s}{R_c}\right] / [NV_q]^2$$

$$c_5 = c_3\left[6c_3 + \frac{1}{80(NV_q)^2}\right]$$

$$c_7 = c_3\left[-48c_3^2 + \frac{9c_3}{20(NV_q)^2} + \frac{30}{112(NV_q)^4}\right]$$

For circuit 800, the input voltage component appearing across at the output is nulled (i.e., $c_1 = 0$) due to the transformer 810. The remaining coefficients of expansion are the same as those for circuit 600. These coefficients can then be used to produce an inverse transfer function approximation of the modulator output intensity of the optical modulator 120 under procedures described herein.

Figure 7:
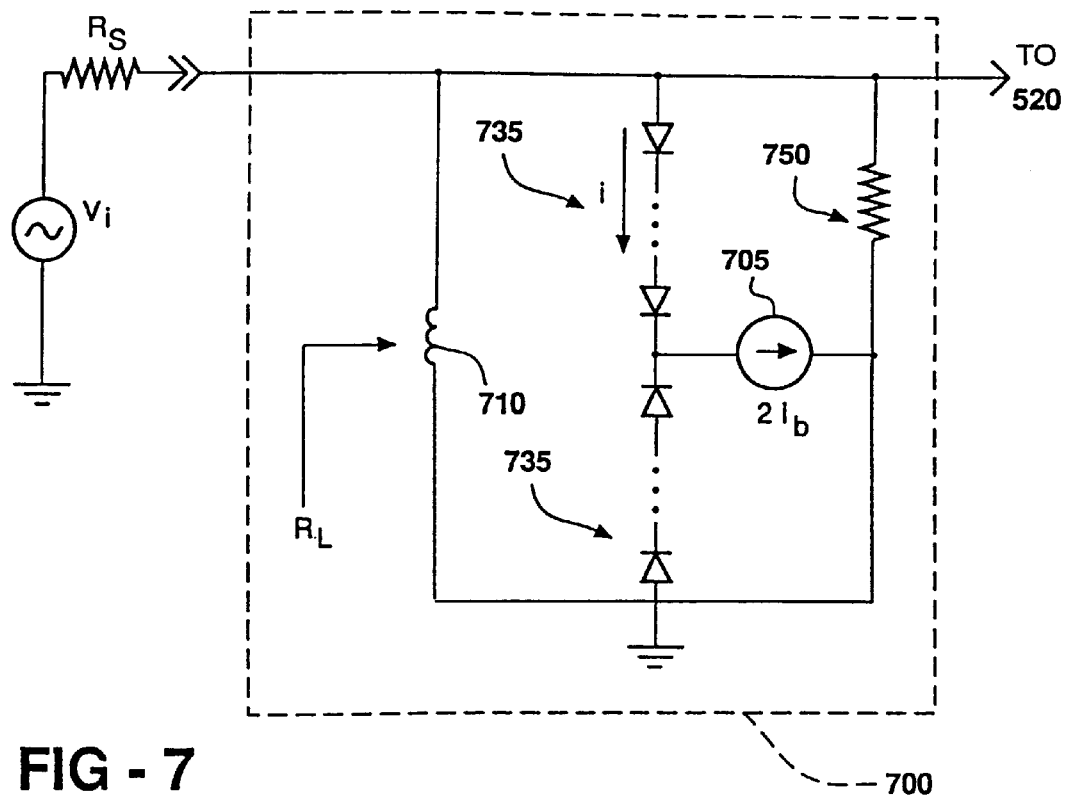
FIG. 7 is an electrical circuit diagram of a series diode predistortion circuit for use with the in-line-type odd-order linearizer.

FIG. 7 shows an electrical circuit diagram of a series diode predistortion circuit 700, another embodiment of the odd-order generator 510 to be used in conjunction with the in-line-type odd-order linearizer 110B. The circuit 700 has a bias current generator 705, two series of N diodes 735, an inductor 710 and a resistor 750. A voltage source $V_i$ and resistor $R_s$ are included to schematically represent the incoming RF signal from the RF source 105. The inductor 710 is connected to provide a return path for the DC bias current in the upper series of N diodes 735. The two series of N diodes 735 are connected in series and biased towards each other with the RF signal at one end and ground at the other end. The bias from the bias current generator 705 flows downward through the upper series of N diodes 735 and upward through the lower series of N diodes 735. The resistor 750 having a value of $R_d$ is connected to the incoming RF signal at one end and to the bias current generator 705 and ground at the other end.

Figure 9:
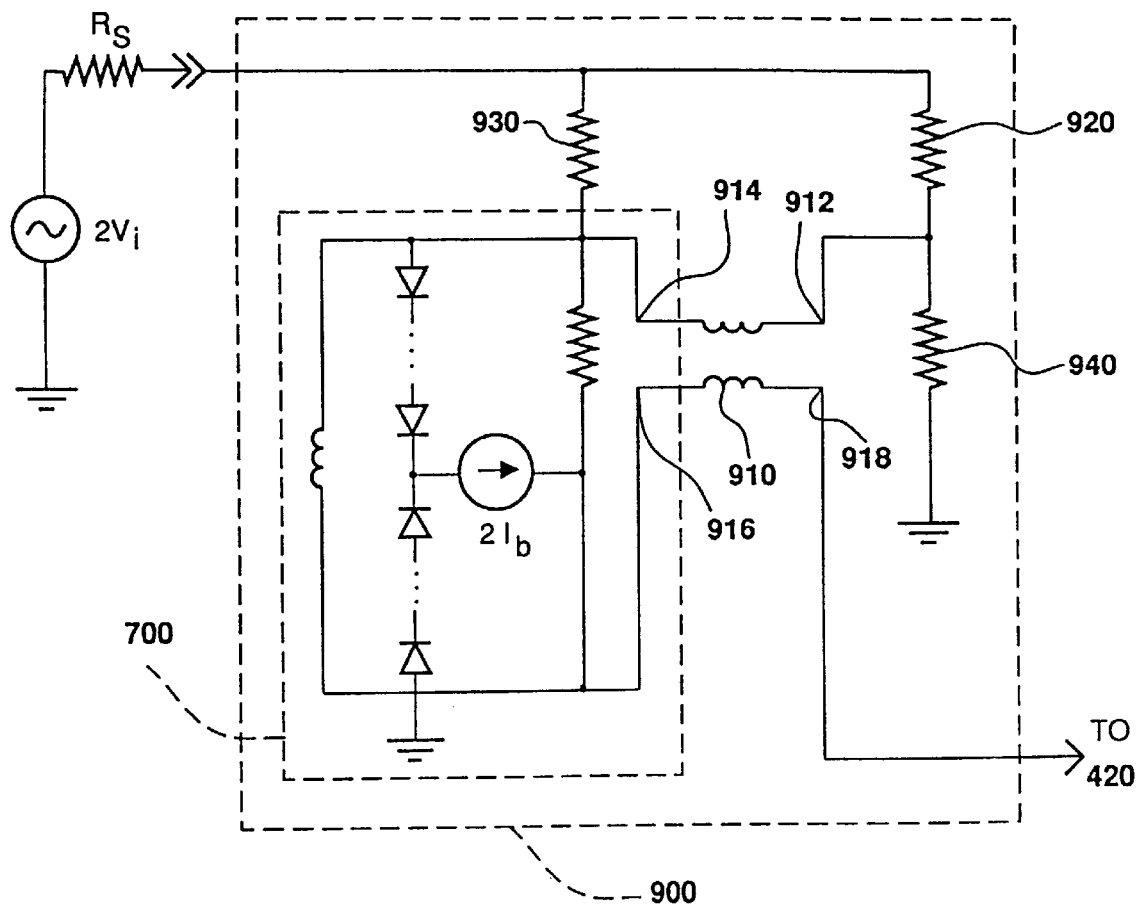
FIG. 9 is an electrical circuit diagram of a series diode predistortion circuit for use with the branch-type odd-order linearizer.

FIG. 9 shows an electrical circuit diagram of a series diode predistortion circuit 900, another embodiment of the odd-order generator 410 to be used in conjunction with the branch-type odd-order linearizer 110A. The circuit 900 includes the components of the circuit 700 of FIG. 7 as well as resistors 920, 930, 940 and a transformer 910. A voltage source $2V_i$ and resistor $R_s$ are included to schematically represent the incoming RF signal from the RF source 105. Resistor 930 having a value of $R_d$ couples the incoming RF signal to the circuit 700 of FIG. 7 and the transformer 910 at 914. The transformer 910 is preferably a 1-to-1 balanced-unbalanced transformer. Resistor 920 couples the incoming RF signal to the transformer 910 at 912 and resistor 940. The other end of resistor 940 is tied to ground. Transformer 910 is also connected to ground at 916. Transformer 910 subtracts the RF signal component and outputs the distorted signal at 918.

The formula for the voltage across the two series of N diodes for circuits 700, 900 (the output voltage) can be expressed as:

$$V = 2NV_q a\tan h(i/I_b)$$

where i is the signal current flowing through the series of N diodes 735 which first receives the incoming RF signal. This equation describes an expansive nonlinear impedance characteristic as defined by Nazarathy et al. in U.S. Pat. No. 5,282,072. The output voltage can then be expresses as a power series expression as a function of the input voltage $V_i$ as follows:

$$V = d_1 V_i + d_3 V^3_i + d_5 V^5_i + d_7 V^7_i$$

The coefficients of expansion under matched power conditions (i.e., $R_S = R_L$) for circuit 700 are given by:

$$d_1 = \frac{1}{2}$$

$$d_3 = \frac{1}{48}\left[1 - \frac{R_s}{R_d}\right][NV_q]^2$$

$$d_5 = d_3\left[6d_3 - \frac{1}{30(NV_q)^2}\right]$$

$$d_7 = d_3\left[-24d_3^2 - \frac{6d_3}{15(NV_q)^2} + \frac{51}{315(NV_q)^4}\right]$$

For circuit 900, the voltage at the output is nulled (i.e., $d_1 = 0$) due to the transformer 910. The remaining coefficients of expansion are the same as those for circuit 700. These coefficients can then be used to produce an inverse transfer function approximation of the modulator output intensity of the optical modulator 120 under procedures described herein.

When the signal voltage $V_o$ is applied to the single-stage modulator 120A, the signal modulates the modulator electrodes. For the branch-type odd-order linearizer 110A, the signal voltage $V_o = V_i + \alpha GV$, where $\alpha$ is the coupling loss due to the directional coupler 460 (assumed $\alpha=1$ for simplicity). For the in-line-type odd-order linearizer 110B, the signal voltage $V_o = GV$. The modulator optical phase angle can be expressed as:

$$\beta = x + b_3 x^3 + b_5 x^5 + b_7 x^7$$

For the in-line-type odd-order linearizer 110B utilizing the shunt diode predistortion circuit 600 the coefficients are:

$$b_3 = 2\left(\frac{2V_\pi}{\pi G}\right)^2 c_3$$

$$b_5 = 2\left(\frac{2V_\pi}{\pi G}\right)^4 c_5$$

$$b_7 = 2\left(\frac{2V_\pi}{\pi G}\right)^6 c_7$$

A similar expression can be derived for the odd-order linearizer 110B utilizing a series diode predistortion circuit 700 by simply replacing the coefficient of expansion terms $C_3$, $c_5$, and $c_7$ with $d_3$, $d_5$, and $d_7$ respectively.

For the branch-type odd-order linearizer 110A utilizing shunt diode predistortion circuit 800, the coefficients are $$b_3 = 2\left(G\left(\frac{2V_\pi}{\pi}\right)\right)^2 c_3$$

$$b_5 = 2\left(G\left(\frac{2V_\pi}{\pi}\right)\right)^4 c_5$$

$$b_7 = 2\left(G\left(\frac{2V_\pi}{\pi}\right)\right)^6 c_7$$

A similar expression can be derived for the branch-type odd-order linearizer 110A utilizing a series diode predistortion circuit 900 by simply replacing the coefficient of expansion terms $C_3$, $c_5$, and $c_7$ with $d_3$, $d_5$, and $d_7$ respectively.

Coefficients $b_3$ and $b_5$ can now be matched to corresponding power series coefficients of the inverse transfer function of the MZI 120, thereby suppressing distortion components for the third- and fifth-order. For instance, for a single-stage MZI 120 having a modulator optical phase with an inverse transfer function as expressed by equation (1) using an in-line-type odd-order linearizer 110B, coefficients $b_3$ and $b_5$ can be equated to ⅙ and ³⁄₄₀ respectively. Moreover, coefficients $b_3$ and $b_5$ can be adjusted and controlled in magnitude and sign by selecting the appropriate values for $R_c$ or $R_d$ (resistors 630 or 750) and G (gain amplifier 420 or 520). The values may be readily determined by mathematical calculations. Resistors 630, 750 are preferably variable resistors such that $R_c$ or $R_d$ may be adjusted or tweeked to obtain proper values for coefficients $b_3$ and $b_5$. For the same reason, G may be adjusted or tweeked by making proper adjustments to the variable attenuator at the output of the gain amplifier 420, 520 of the odd-order linearizer 110 of FIGS. 4 or 5. If the values for resistors 630, 750 are adjusted or tweeked, however, the values for the bias current generators 605, 705 also must be adjusted to change the small-signal dynamic resistance of the two series of N diodes 635, 735 to maintain matched power conditions where $R_S = R_L$.

By altering the value of the bias current generator 605 or 705 the effective impedance of the N diodes is altered thereby allowing adjustment of the distortion coefficients. First, the values of the bias current generators 605, 705 must be chosen to match the load impedance $R_L$ to the source impedance $R_S$. Values $R_c$ or $R_d$ for resistors 630 or 750 can then be chosen to control the coefficient and sign of third- and fifth-order predistortion transfer function components of the predistorted signal to follow the inverse function of the modulation function. Predistortion circuits 800 and 900 may also be implemented similarly. These calculations have assumed no coupling loss due to the directional couplers 450 and 460 for the branch-type odd-order linearizer 110A. Coupling loss may be included by appropriately scaling the input voltage of the incoming RF signal.

Similar calculations can be made for predistortion circuits 600, 700, 800, 900 utilizing a dual-stage cascaded MZI 120B to suppress third- and fifth-order distortion components. In the case where a dual-stage cascaded MZI 120B is being used, $\gamma$ may also need to be adjusted to adjust the coefficients of distortion and to maintain matched power conditions.

Figure 10:
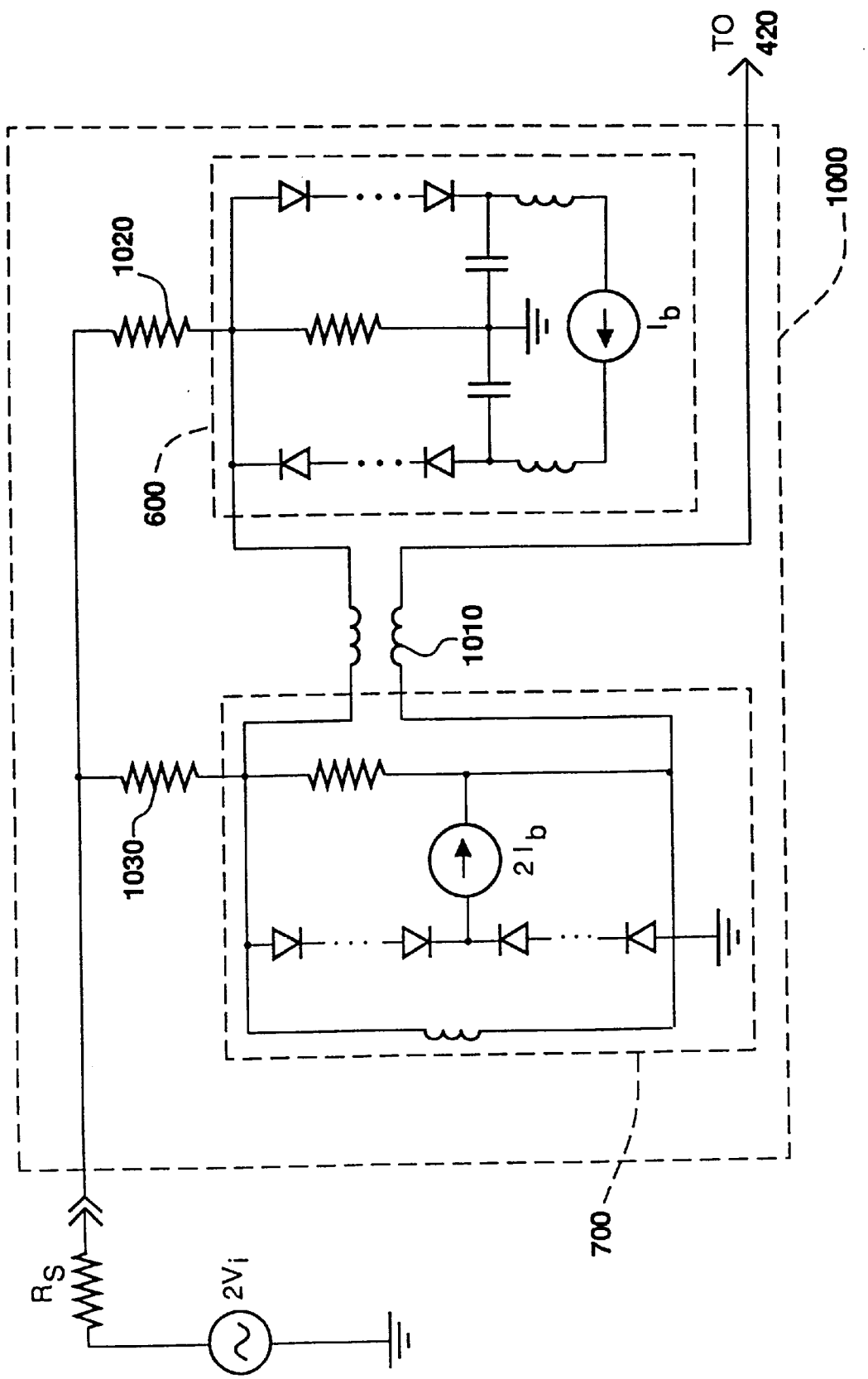
FIG. 10 is an electrical circuit diagram of a predistortion circuit having the shunt diode predistortion circuit of FIG. 6 in combination with the series diode predistortion circuit of FIG. 7 for use with the branch-type odd-order linearizer.

Third-, fifth-, and seventh-order distortion components may be suppressed as described below in conjunction with FIGS. 10 and 11. FIG. 10 is an electrical circuit diagram of a shunt diode predistortion circuit 600 in combination with a series diode predistortion circuit 700, another embodiment 1000 of the odd-order generator 410 for use with the branch-type odd-order linearizer 110A. Under this embodiment, third-, fifth- and seventh-order distortion components may be controlled using circuits 600 and 700 in conjunction. A voltage source $2V_i$ and resistor $R_S$ are included to schematically represent the incoming RF signal from the RF source 105. The circuit 1000 has the shunt diode predistortion circuit 600 in parallel with the series diode predistortion circuit 700. Circuits 600 and 700 are connected to receive the incoming RF signal through resistors 1020 and 1030 respectively. Thus, the circuit has both a compressive nonlinear impedance characteristic from the shunt diode predistortion circuit 600 and an expansive nonlinear impedance characteristic from the series diode predistortion circuit 700. The shunt and series diode predistortion circuits 600 and 700 are connected with a transformer 1010 which is a 1-to-1 balanced-unbalanced transformer. The output signal from the transformer 1010 is then fed to the gain amplifier 420.

Figure 11:
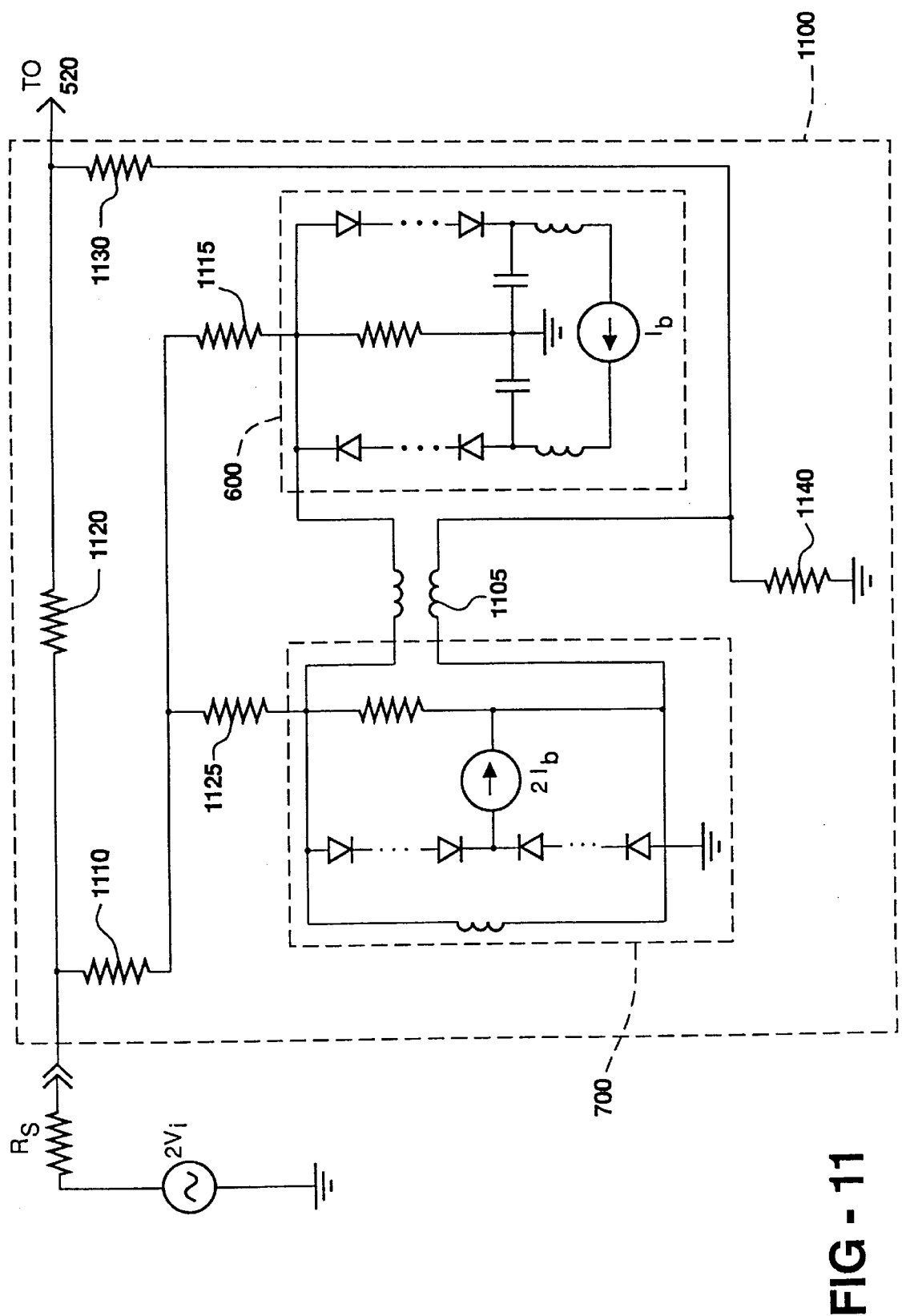
FIG. 11 is an electrical circuit diagram of a predistortion circuit having the shunt diode predistortion circuit of FIG. 6 in combination with the series diode predistortion circuit of FIG. 7 for use with the in-line-type odd-order linearizer.

FIG. 11 is an electrical circuit diagram of a shunt diode predistortion circuit 600 in combination with a series diode predistortion circuit 700, another embodiment 1100 of the odd-order generator 510 for use with the in-line-type odd-order linearizer 110B. Under this embodiment, third-, fifth- and seventh-order distortion components may be controlled using circuits 600 and 700 in conjunction. A voltage source $2V_i$ and resistor $R_S$ are included to schematically represent the incoming RF signal from the RF source 105. The incoming RF signal is split into two paths using a power divider (not shown). The first path receives the RF signal through a resistor 1110 and feeds it to circuits 600 and 700 through resistors 1115 and 1125 respectively. Circuit 1100 is essentially the same as that of FIG. 10. The output is coupled to resistors 1140 and 1130. Resistor 1140 is tied to the ground at the other end. Resistor 1130 is coupled to the output of the second path at the other end. The second path includes a resistor 1120 and a delay line (not shown). The output signals from the first and second path are combined (with a power divider) and output to the gain amplifier 420. The resistors 1110, 1120, 1130, and 1140 result in attenuation of the input voltage of the incoming RF signal. This attenuation loss may be accounted for by appropriately scaling the input voltage of the incoming RF signal.

Under circuit 1000, the coefficients of expansion under matched power conditions ($R_S=R_L$) can then be given by:

$e_1=0$
$e_3=c_3-d_3$
$e_5=c_5-d_5$
$e_7=c_7-d_7$

For circuit 1100, these values may need to be scaled to account for the attenuation caused by the additional resistors.

Once again, coefficients relating to the modulator optical phase angle, $b_3$, $b_5$ and $b_7$, can now be matched using a computer program to corresponding power series coefficients of the inverse transfer function of the single-stage MZI (equation (1)), thereby suppressing distortion components for the third-, fifth-, and seventh-order.

Further, similar calculations can be made for a dual-stage cascaded MZI. In the case where a dual-stage cascaded MZI is being used, $\gamma$ may also need to be adjusted to match the inverse transfer function of the MZI. These calculations have assumed no coupling loss due to the directional couplers 450 and 460 for the branch-type odd-order linearizer 110A. Coupling loss may be included by appropriately scaling the input voltage of the incoming RF signal. Also, attenuation loss due to resistors 1110, 1120, 1130, and 1140 may accounted for by appropriately scaling the input voltage of the incoming RF signal.

Figure 12:
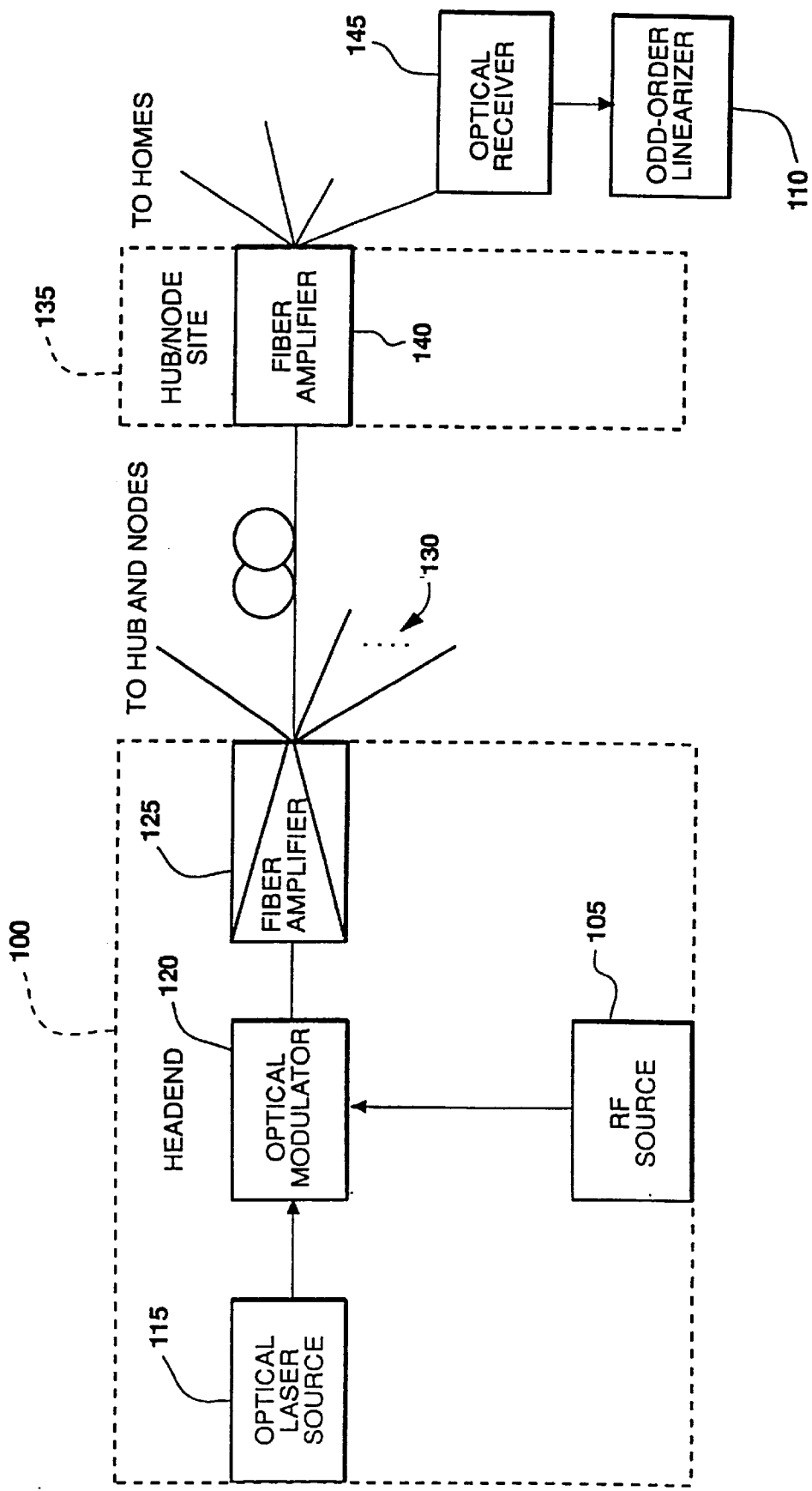
FIG. 12 is a block diagram of another embodiment of the invention.

FIG. 12 is a system block diagram of an optical communications system in accordance with another embodiments of the present invention. The optical receiver 145 under this embodiment is essentially the same as that of FIG. 1 except that the odd-order linearizer 110 is now after the optical receiver 145. The odd-order linearizer 110 serves as a postdistortion circuit to linearize the distortion in the signal that was created as a result of modulation by the optical modulator 120. The odd-order linearizer 110 may be implemented in exactly the same way as it was described for the other embodiments of the present invention. Namely, the odd-order linearizer 110 may be implemented with either a single-stage or a dual-stage cascaded MZI at the headend 100. Further, either odd-order linearizers 110 of FIGS. 4 and 5 may be implemented except that the limiter is not necessary in this embodiment since the signal has already experienced clipping-induced distortion. Finally, any one of the odd-order generators 410, 510 of FIGS. 6–11 may be implemented.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrated rather than restrictive sense. Accordingly, it is not intended that the invention be limited except as may be necessary in view of the appended claims.

We claim:

1. A linearizer for a non-linear device producing an optical signal having a distortion component, said distortion component being represented as a transfer function, said transfer function having an inverse transfer function which can be represented as a power series expression, said power series expression having at least three terms and associated coefficients, said linearizer comprising in combination:

a. a common input terminal for receiving an RF signal from an RF signal source;

b. a distortion circuit for processing said RF signal to generate predistortion components, said predistortion components corresponding to said at least three associated coefficients of said power series expression of said inverse transfer function;

c. a common output terminal for transmitting said RF signal and said distortion components to said non-linear device to reduce greater than fifth order distortion components.

2. The linearizer of claim 1, wherein said distortion circuit has:

a. at least one group of series connected diodes coupled at one end to a common input terminal for receiving a signal source;

b. resistance means coupled to said common input terminal; and c. bias means coupled to the opposite end of said at least one group of series connected diodes for providing a bias current, wherein fifth-order and seventh-order distortion components are reduced.

3. The linearizer of claim 1, wherein said distortion circuit has:

a. a first group of series connected diodes coupled to a common input terminal at one end for receiving a signal source;

b. a second group of series connected diodes coupled to the opposite end of said first group of series connected diodes;

c. resistance means coupled to said common input terminal;

d. bias means coupled to said opposite end of said first group of series connected diodes for providing a bias current to said first group of series connected diodes and said second group of series connected diodes, wherein fifth-order and seventh-order distortion components are reduced.

4. The linearizer of claim 1, further comprising means for amplifying said signal to provide a voltage gain.

5. The linearizer of claim 1, wherein said distortion signal has:

a. at least one group of series connected diodes coupled at one end to a common input terminal for receiving a signal source;

b. resistance means coupled to said common input terminal; and c. bias means coupled to the opposite end of said at least one group of series connected diodes for providing a bias current, wherein fifth-order and seventh-order distortion components are reduced.

6. The linearizer of claim 1, wherein said distortion circuit has:

a. a first group of series connected diodes coupled to a common input terminal at one end for receiving a signal source;

b. a second group of series connected diodes coupled to the opposite end of said first group of series connected diodes;

c. resistance means coupled to said common input terminal;

d. bias means coupled to said opposite end of said first group of series connected diodes for providing a bias current to said first group of series connected diodes and said second group of series connected diodes, wherein fifth-order and seventh-order distortion components are reduced.

7. The linearizer of claim 1, further comprising means for amplifying said signal to provide a voltage gain.

8. A linearizer for an optical receiver producing an RF signal having a distortion component, said distortion component being represented as a transfer function, said transfer function having an inverse transfer function which can be represented as a power series expression, said power series expression having at least three terms and associated coefficients, said optical receiver comprising in combination:

a. a common input terminal for receiving said RF signal from said optical receiver;

b. a distortion circuit for processing said RF signal to generate postdistortion components, said postdistortion components canceling at least three of said associated coefficients of said power series expression of said inverse transfer function producing a linearized RF signal in which at least fifth-order and seventh-order distortion components are reduced;

c. a common output terminal for transmitting said linearized RF signal.

* * * * *